(12) United States Patent
Gwon et al.

(10) Patent No.: US 8,985,625 B2
(45) Date of Patent: Mar. 24, 2015

(54) MIDDLE SIDE AIRBAG CONFINED BETWEEN ARM-REST AND SEAT

(75) Inventors: Tae Ik Gwon, Osan-si (KR); Soon-Bok Lee, Yongin-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/883,163

(22) PCT Filed: Oct. 27, 2011

(86) PCT No.: PCT/KR2011/008065
§ 371 (c)(1),
(2), (4) Date: May 2, 2013

(87) PCT Pub. No.: WO2012/060574
PCT Pub. Date: May 10, 2012

(65) Prior Publication Data
US 2013/0221640 A1     Aug. 29, 2013

(30) Foreign Application Priority Data
Nov. 3, 2010   (KR) .................. 10-2010-0108613

(51) Int. Cl.
*B60R 21/231* (2011.01)
*B60R 21/2334* (2011.01)
(Continued)

(52) U.S. Cl.
CPC ........... *B60R 21/231* (2013.01); *B60R 21/2334* (2013.01); *B60R 21/2165* (2013.01); *B60R 2021/23146* (2013.01); *B60N 2002/5808* (2013.01); *B60R 2021/23161* (2013.01)
USPC .................... 280/743.1; 280/730.2

(58) Field of Classification Search
CPC .................................................. B60R 21/207

USPC ............................................ 280/730.2, 743.1
See application file for complete search history.

(56) References Cited

U.S. PATENT DOCUMENTS 6,206,411 B1    3/2001  Sunabashiri
6,773,026 B2 *  8/2004  Meyer .......................... 280/729
(Continued)

FOREIGN PATENT DOCUMENTS

DE      10038088 A1    2/2002
JP      2008-120146 A  5/2008
(Continued)

OTHER PUBLICATIONS

International Search Report for PCT/KR2011/008065, ISA/KR, Daejeon, mailed May 21, 2012.

*Primary Examiner* — James English
(74) *Attorney, Agent, or Firm* — Harness, Dickey & Pierce, P.L.C.

(57) ABSTRACT

An airbag arrangement includes a middle side airbag confined between an arm-rest and a seat. The middle side airbag protects a driver of a vehicle and a passenger from the collision between the driver and the passenger upon vehicle collision. A cushion inflated from a back part of a driver seat is firmly fixed between the driver seat and an arm-rest to restrict the movement of occupants. The middle side airbag includes vertical sewed lines to vertically form a partition, or includes inclined sewed lines to inflate the middle side airbag toward at an expected collision position between the driver and the passenger. An inflator is provided on a lateral surface of a back part of the driver seat. As soon as air is injected into the middle side airbag, the middle side airbag is inflated while forming contact parts confined in the space between an arm-rest and a seat.

11 Claims, 4 Drawing Sheets

(51) Int. Cl.
*B60R 21/2165* (2011.01)
*B60N 2/58* (2006.01)

(56) References Cited

U.S. PATENT DOCUMENTS

| | | | |
|---|---|---|---|
| 7,549,672 B2 * | 6/2009 | Sato et al. | 280/730.2 |
| 7,735,858 B2 * | 6/2010 | Megiveron et al. | 280/730.2 |
| 7,819,419 B2 * | 10/2010 | Hayashi et al. | 280/730.1 |
| 7,971,901 B2 * | 7/2011 | Tomitaka et al. | 280/730.2 |
| 7,976,058 B2 * | 7/2011 | Suzuki et al. | 280/729 |
| 8,246,076 B2 * | 8/2012 | Schmidt et al. | 280/730.2 |
| 8,414,018 B2 * | 4/2013 | Choi et al. | 280/730.1 |
| 8,485,551 B2 * | 7/2013 | Dainese et al. | 280/730.2 |
| 2004/0124615 A1 * | 7/2004 | Tanase et al. | 280/730.2 |
| 2008/0129024 A1 * | 6/2008 | Suzuki et al. | 280/734 |
| 2009/0001695 A1 * | 1/2009 | Suzuki et al. | 280/730.2 |
| 2010/0264631 A1 * | 10/2010 | Tomitaka et al. | 280/730.2 |
| 2010/0295280 A1 * | 11/2010 | Tomitaka et al. | 280/730.1 |
| 2011/0074141 A1 * | 3/2011 | Wipasuramonton et al. | 280/736 |
| 2012/0091697 A1 * | 4/2012 | Wiik et al. | 280/730.2 |

FOREIGN PATENT DOCUMENTS

| | | |
|---|---|---|
| JP | 2010-143233 A | 7/2010 |
| KR | 10-0352659 B1 | 9/2002 |

* cited by examiner

US 8,985,625 B2

MIDDLE SIDE AIRBAG CONFINED BETWEEN ARM-REST AND SEAT

CROSS-REFERENCE TO RELATED APPLICATIONS

This application is a 371 U.S. National Stage of International Application No. PCT/KR2011/008065, filed Oct. 27, 2011. This application claims priority to Korean Patent Application No. KR 10 2010-0108613, filed Nov. 3, 2010. The disclosures of the above applications are incorporated herein by reference.

TECHNICAL FIELD

The present invention relates to a middle side airbag, capable of preventing a driver of a vehicle and an occupant seated in a passenger seat from being injured due to the collision between the driver and the passenger upon vehicle collision, or capable of restricting the movement of the driver toward the passenger seat upon side collision even if the driver is alone seated in the vehicle. More particularly, the present invention relates to a middle side airbag, in which a cushion inflated from a back part of a driver seat is firmly fixed between the driver seat and a horizontal arm-rest part or a vertical arm-rest part to provide sufficient strength to the lateral side of the occupant, so that the movement of the occupant can be restricted.

Further, the middle side airbag according to the present invention includes vertical sewed lines to prevent the middle side airbag from being inflated in a lateral direction and vertically form a partition, or includes inclined sewed lines such that the middle side airbag is inflated toward the front of the vehicle at which the collision between the driver and the passenger of the passenger seat is expected. Accordingly, the middle side airbag according to the present invention can more efficiently prevent or reduce the collision between the driver and the occupant in the passenger seat.

BACKGROUND ART

In general, an airbag is a representative safety device protecting occupants from vehicle collision.

Such an airbag is classified into a driver front airbag (DAB) and a passenger front airbag (PAB), which are installed in a steering wheel and an instrumental penal, respectively, to protect the driver and passengers from colliding with the internal structures of a vehicle upon vehicle collision, and a curtain airbag (CAB) installed in a side portion of a vehicle to enhance the safety of the occupants upon side collision.

Recently, an airbag is installed in a console between the driver and the passenger to prevent occupants at the front of a vehicle from colliding with each other, or a middle side airbag is additionally installed to prevent the driver from being sprung toward a side of the vehicle even if an occupant is absent in the passenger seat.

The middle side airbag is generally designed to be inflated between the driver seat and the passenger seat as described above. FIG. 1 shows a middle side airbag disclosed in a German Patent Publication No. DE 10038088 A1 as an example of a related art. According to the related art, as shown in FIG. 1, the middle side airbag is deployed from the lateral surface of the arm-rest part 5 including a console box.

As described above, a deployment hole 7 of the middle side airbag is positioned higher than a seat part 3a. In this case, the middle side airbag is inflated in a lateral direction without forming a partition.

In other words, when the middle side airbag is deployed while forming a wall (a partition) in a vertical direction, the driver or a passenger 1 can be sufficiently protected. However, the middle side airbag is not stuck between a set of a back part 3b and the seat part 3a and an arm-rest part 5, so that the function of the middle side airbag cannot be sufficiently realized.

Therefore, the driver and the passenger 1 may collide with each other and may be seriously injured on side collision of the vehicle, or the driver gets out of the driver seat to the passenger seat when the driver is alone seated in the vehicle, so that fatal accidents may occur.

DISCLOSURE OF INVENTION

Technical Problem

The present invention has been made to solve the problems occurring in the related art, and an object of the present invention is to provide a middle side airbag, which can be deployed while forming a partition upon side collision of a vehicle to confine a driver and a passenger at the right and left, thereby preventing the driver from colliding with the passenger or can restrict the movement of the driver to a passenger seat caused by the side collision of the vehicle even if the driver is alone seated in the vehicle.

Another object of the present invention is to provide a middle side airbag in which a cushion inflated from a back part of a driver seat can be firmly fixed between the driver seat and a horizontal arm-rest part or a vertical arm-rest part, so that a partition can be formed between the driver and the passenger, and sufficient strength to the lateral side of the occupant can be provided, so that the movement of occupants can be restricted.

A still another object of the present invention is to provide a middle side airbag, capable of restricting the movement of a driver and a passenger upon side collision of a vehicle by providing vertical sewed lines or inclined sewed lines to enhance the strength of the middle side airbag in a vertical direction by restricting the lateral inflation of the middle side airbag because a partition is difficult to be formed due to the lateral inflation when the middle side airbag between a driver seat and a passenger seat is deployed on the vehicle collision.

A still another object of the present invention is to provide a middle side airbag, in which sewed lines to restrict lateral inflation of the middle side airbag are inclined such that a partition can be formed at the front of the vehicle, at which the collision between a driver and a passenger of a passenger seat is expected, thereby preventing the driver and the passenger of the passenger from being injured by efficiently preventing impact caused by the collision between the driver and the passenger.

Solution to Problem

In order to accomplish the objects, the present invention can be realized by embodiments having the following structure, and the present invention includes the following structure.

According to one embodiment of the present invention, there is provided a middle side airbag inflated between a driver and a passenger to prevent the driver and the passenger from being injured due to collision between the driver and the passenger. An inflator to inject air to the middle side airbag is provided on a lateral surface of a back part of a driver seat in a vehicle. Then, as soon as air is injected into the middle side airbag, the middle side airbag is inflated while forming contact parts confined in the space between an arm-rest, on which the driver of the vehicle or a passenger puts his/her arm, and a seat.

According to another embodiment of the present invention, the arm-rest includes horizontal and vertical arm-rests, the contact parts are formed in the space between the vertical arm-rest and a back of the seat, and an arm-rest side contact part and a seat side contact part are firmly fixed by friction caused by strong internal pressure of the middle side airbag.

According to still another embodiment of the present invention, the middle side airbag further includes a vertical sewed line to prevent the middle side airbag from being inflated in a lateral direction, thereby forming a vertical partition between the driver seat and the passenger seat, or includes an inclined sewed line enabling the formation of a partition at a position between the driver seat and the passenger seat at which collision between the driver and the passenger of the passenger seat is expected.

Advantageous Effects of Invention

As described above, the present invention can have the following effects through the combination and the operating relation between units solving the problems and following components.

According to the present invention, the middle side airbag is confined between an arm-rest part and a seat part when the middle side airbag is deployed, so that the lateral inflation of the middle side airbag can be restricted. Accordingly, the driver and the passenger of the passenger seat can be prevented from being injured when the driver and the passenger collide with each other. In addition, even if the driver is alone seated in the vehicle, the driver can be prevented from moving to the passenger seat due to side impact.

According to the present invention, a cushion inflated from a back part of a driver seat can be firmly fixed between the driver seat and a horizontal arm-rest part or a vertical arm-rest part, so that a partition can be formed between the driver and the passenger. In addition, sufficient strength to the lateral side of the occupant can be provided, thereby reducing impact with respect to left or right side portions of the driver or the passenger upon vehicle collision.

According to the present invention, since a partition is difficult to be formed due to the excessive lateral inflation when the middle side airbag between a driver seat and a passenger seat is inflated upon vehicle collision, the middle side airbag includes vertical sewed lines or inclined sewed lines to enhance the strength of the middle side airbag in a vertical direction by restricting the lateral inflation of the middle side airbag. Accordingly, the movement of a driver and a passenger can be restricted upon the side collision of the vehicle.

According to the present invention, sewed lines to restrict lateral inflation of the middle side airbag are inclined such that a partition can be formed at the front of the vehicle, at which the collision between a driver and a passenger of a passenger seat is expected, thereby preventing the driver and the passenger of the passenger from being injured by efficiently preventing impact caused by the collision between the driver and the passenger.

MODE FOR THE INVENTION

Hereinafter, a middle side airbag confined between an arm-rest part and a seat part according to an exemplary embodiment of the present invention will be described in detail with reference to accompanying drawings.

Prior to explaining the detailed description, it should be understood that the terms or words used in the present specification and claims may not be limited to common meanings or dictionary meanings, but interpreted as a meaning or a concept appropriate to the technical scope of the present invention under the principle that the inventor can coin new words to explain the present invention in the best manner.

Accordingly, the embodiments described in the present specification and the structure shown in accompanying drawings are only for illustrating the exemplary embodiments of the present invention within the technical scope of the present invention. Accordingly, the person skilled in the art should comprehend that various equivalents and modifications can be made in place of the embodiments.

Hereinafter, a middle side airbag 100 confined between an arm-rest part and a seat part according to the present invention will be described with reference to FIGS. 2 to 4.

Figure 2:
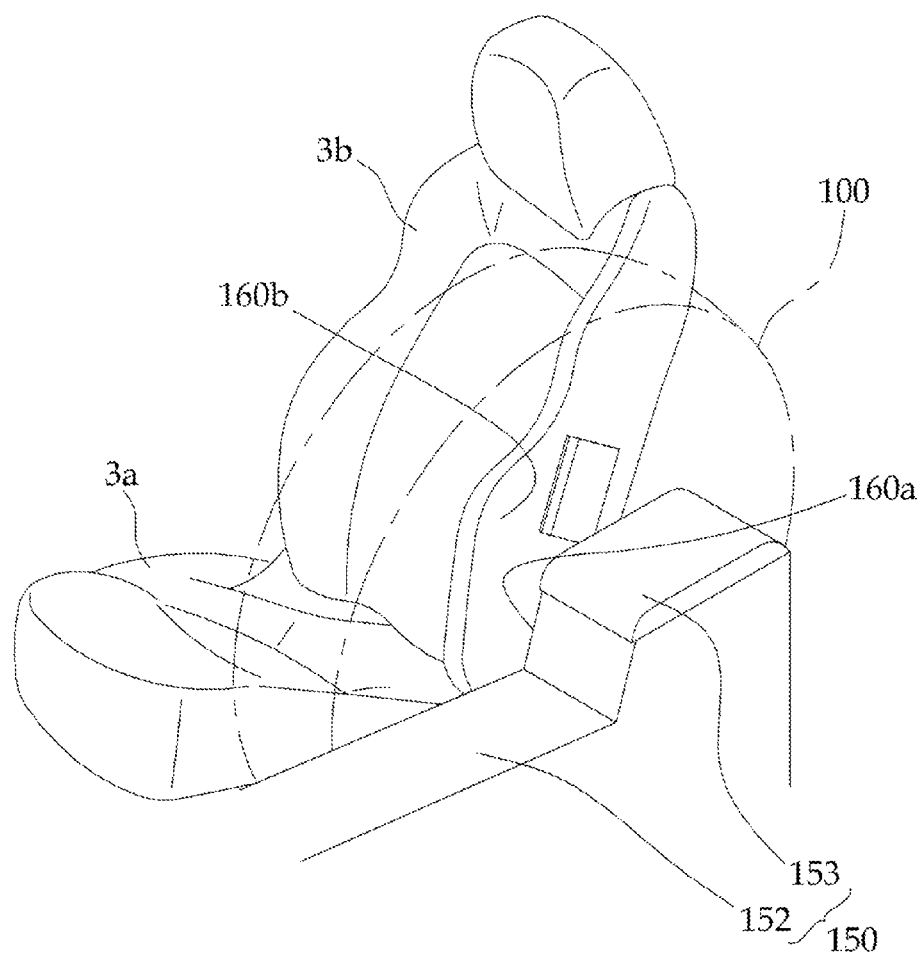
FIG. 2 is a perspective view showing the deployment of a middle side airbag according to the present invention.
Figure 3:
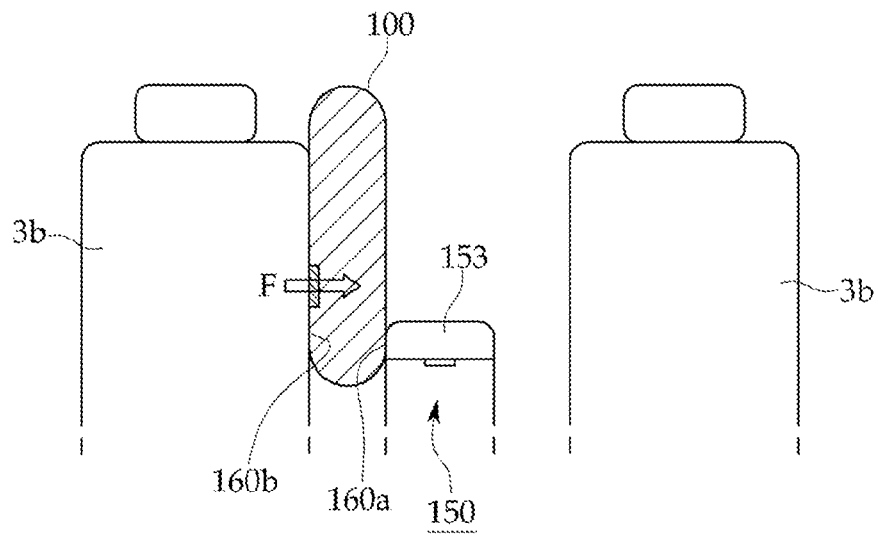
FIG. 3 is an elevation view showing the deployment of a middle side airbag according to the present invention.
Figure 4:
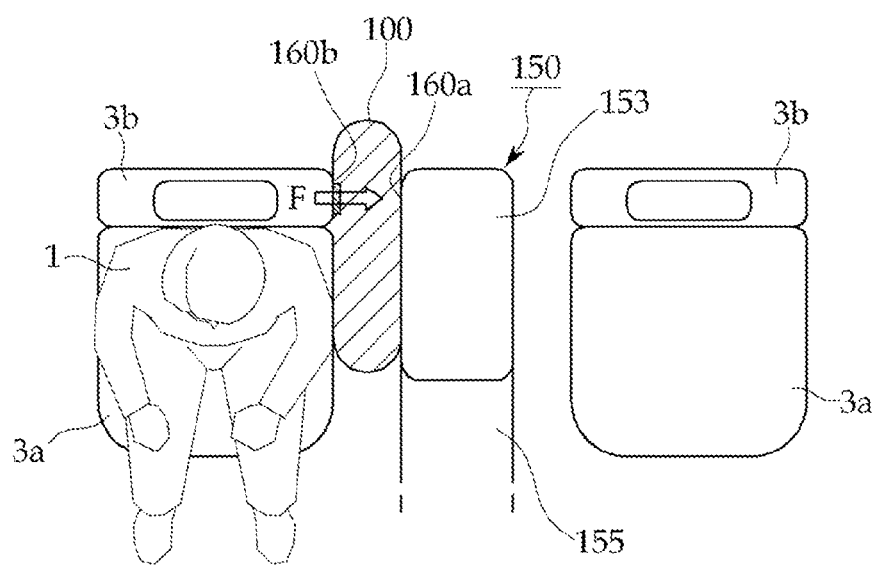
FIG. 4 is a plan view showing the deployment of a middle side airbag according to the present invention.

Referring to FIGS. 2 to 4, the present invention relates to the middle side airbag 100 inflated in the form of a partition between a driver 1 and a passenger such that the driver 1 and the passenger can be prevented from colliding with each other. An inflator F injecting air into the middle side airbag 100 is placed on a lateral surface of a back part 3b of a seat part 3 for a driver of a vehicle.

Then, as soon as air is injected into the middle side airbag 100, the middle side airbag 100 is inflated while forming contact parts 160a and 160b confined in the space between an arm-rest part 150, on which the driver 1 of the vehicle or a passenger puts his/her arm, and the seat part 3

Figure 1:
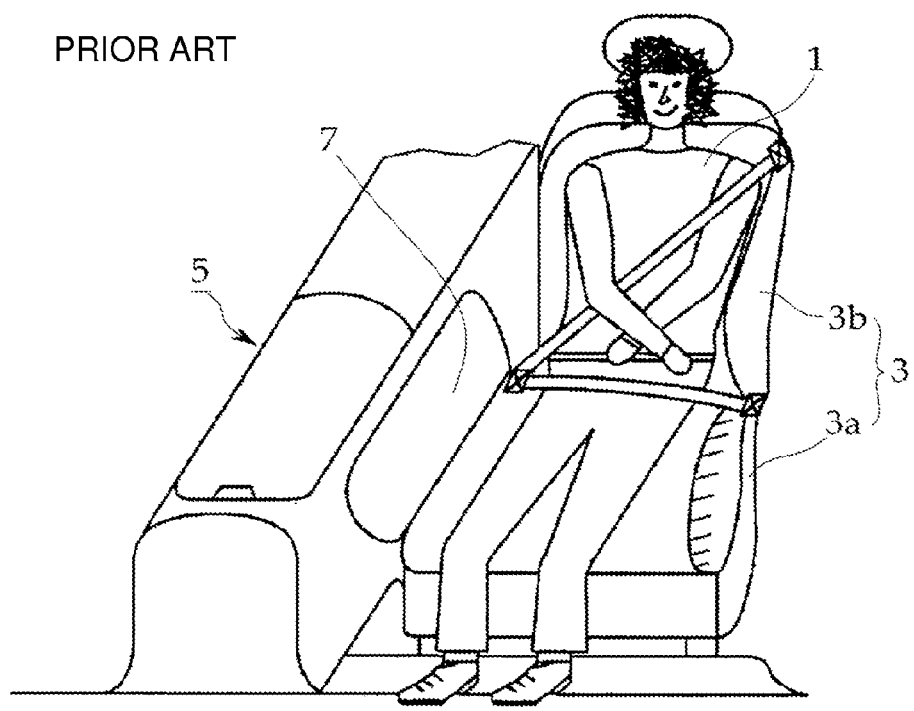
FIG. 1 is a prior art perspective view showing a position in which a middle side airbag according to the related art is deployed.

If the middle side airbag 100 is inflated from the arm-rest part 150 instead of the back part 3b of the seat part 3, the middle side airbag 100 may be laterally inflated rather than vertically inflated as shown in FIG. 1. Accordingly, the middle side airbag 100 may not perform the intrinsic function of a side airbag. Therefore, according to the present invention, the middle side airbag 100 is inflated from the back part 3b of the seat part 3, so that a lower end portion of the middle side airbag 100 is confined in the space between the back part 3b and the arm-rest part 150. Accordingly, the middle side airbag 100 can be vertically inflated.

Referring to FIGS. 3 and 4, the arm-rest part 150 according to the present invention includes a vertical arm-rest part 153 and a horizontal arm-rest part 152, and the contact parts of the middle side airbag 100 that is inflated are confined in the space between the vertical arm-rest part 153 and the back part 3b of the seat part 3 while being fitted into the space.

In other words, as shown in FIG. 3, since the middle side airbag 100 is inflated while the lower portion of the middle side airbag 100 is entering the space between the back part 3b of the seat part 3 and the vertical arm-rest part 153, the middle side airbag 100 has sufficient inflation pressure due to the internal air pressure thereof. Accordingly, the middle side airbag 100 is firmly fitted in the space between the back part 3b of the seat part 3 and the vertical arm-rest part 153.

In addition, the arm-rest side contact part 160a and the seat-side contact part 160b of the contact parts make contact with the arm-rest part 150 and the seat part 3, respectively, due to the strong internal air pressure of the lower portion of an airbag cushion. In this case, since friction is caused on the cushion contact parts 160a and 160b, the lower portion of the airbag cushion is firmly fitted in the space between the arm-rest part 150 and the seat part 3.

Therefore, according to the present invention, the driver 1 of the vehicle and a passenger of a passenger seat can be prevented from being injured due to the collision between them. In addition, even if the driver 1 is alone seated in the vehicle, the driver 1 can be prevented from being sprung toward the passenger seat due to the side collision of the vehicle, so that the driver 1 can be prevented from being injured.

Hereinafter, the middle side airbag 100 according to another embodiment of the present invention will be described with reference to FIGS. 5 and 6.

Figure 5:
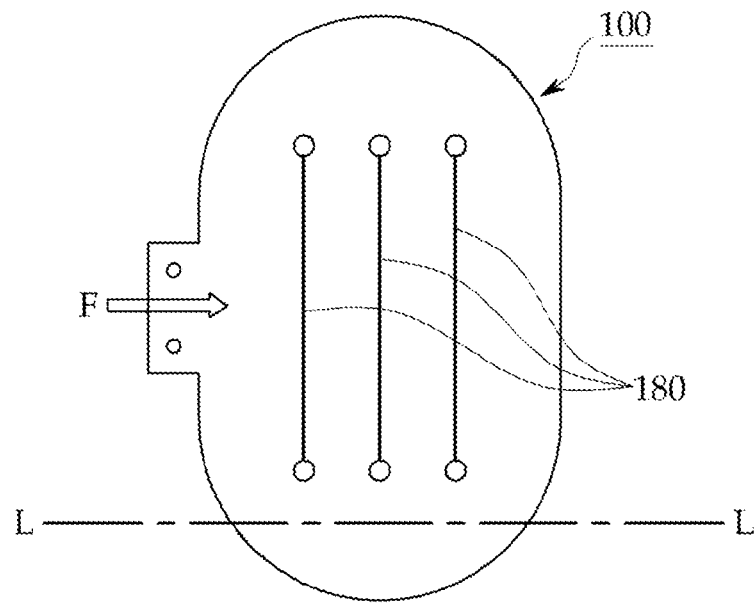
FIG. 5 is an elevation view showing the deployment of a middle side airbag according to another embodiment of the present invention.

Referring to FIG. 5, the middle side airbag 100 according to the present invention includes vertical sewed lines 180 to prevent the middle side airbag 100 from being excessively inflated in the lateral direction, so that a vertical partition can be formed between the driver seat and the passenger seat.

If the middle side airbag 100 is manufactured by using the vertical sewed lines 180 as described above, the middle side airbag 100 is not excessively inflated in the lateral direction when air is injected into the middle side airbag 100 from the inflator F as shown in FIG. 3, so that the middle side airbag 100 can be deployed in the form of a wide plate.

In other words, when an airbag is generally inflated, the airbag has the shape of a large pocket approximating a spherical shape. In contrast, the middle side airbag 100 according to the present invention has to be inflated while forming the vertical partition shown in FIGS. 2 to 4. Accordingly, in order to manufacture the middle side airbag 100 deployed in the shape of a plate having a predetermined thickness, the sewed lines 180 are formed at the side portion of the middle side airbag 100 such that the middle side airbag 100 is deployed in the form of a swim mat float while forming a partition between the driver and the passenger.

Figure 6:
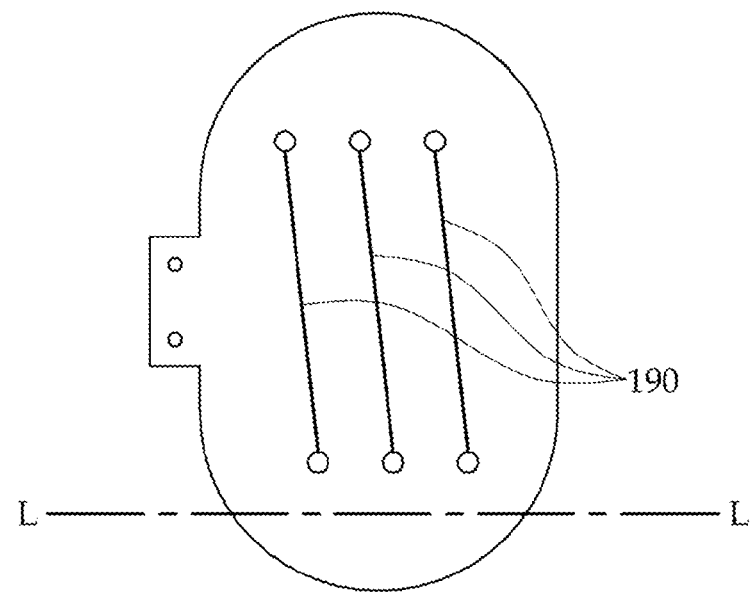
FIG. 6 is an elevation view showing the deployment of a middle side airbag according to still another embodiment of the present invention.

According to still another embodiment of the present invention, as shown in FIG. 6, the middle side airbag 100 may be formed at the side portion thereof with sewed lines 190 that are inclined and not vertically formed.

This is necessary to form a partition at an expected point between the driver seat and the passenger seat at which the driver collides with the passenger while preventing the middle side airbag 100 from being inflated in the lateral direction.

As shown in FIG. 2, when the middle side airbag 100 is inflated from the side portion of the back part 3b of the driver seat 3, even if the vertical partition is formed, the middle side airbag 100 may be inflated to an unnecessary part of the back part 3b. Accordingly, the middle side airbag 100 may not be inflated at the collision position between the driver and the passenger seated in the passenger seat. Therefore, the sewed lines 190, which are inclined, are formed in the middle side airbag 100 such that the middle side airbag 100 is inflated toward the front of the vehicle at which the collision between the driver and the passenger of the passenger seat is expected.

Accordingly, the collision between the driver and the passenger of the passenger seat may be prevented or reduced, so that the driver and the passenger can be prevented from being injured.

Therefore, as shown in the elevation views of FIGS. 5 and 6, the lower end portion of the airbag cushion is positioned under a line L (arm-rest line) extending from the top surface of a vertical arm-rest part, and the lower end portion of the airbag cushion under the arm-rest line L is introduced and confined in the space between the vertical arm-rest part and the back part of the seat. As described above, the middle side airbag according to the present invention is deployed in the form of the wide swim mat float, and the lower end portion of the middle side airbag is firmly confined, so that the middle side airbag can sufficiently act as the partition.

Although the exemplary embodiments of the present invention have been described, it is understood that the exemplary embodiments help one ordinary skilled in the art to easily realize the middle side airbag confined between the arm-rest part and the seat according to the present invention, but the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. An airbag arrangement comprising:
   a middle side airbag inflatable to a position confined between an arm-rest and an occupant seat; and
   an inflator provided on a lateral surface of a back part of the occupant seat in a vehicle to deploy the middle side airbag,
   wherein the middle side airbag includes a plurality of vertically sewed lines for restricting inflation in a lateral direction relative to the occupant seat, the vertically sewed lines spaced apart from one another in the lateral direction, and
   wherein the middle side airbag includes contact parts confined in a space between the arm-rest and the occupant seat after the middle side airbag has been deployed, so that an airbag cushion is inflated vertically or laterally with respect to the passenger.

2. The airbag arrangement of claim 1, wherein the contact parts include an arm-rest side contact part and a seat side contact part which are firmly fixed due to friction caused by strong internal pressure of the middle side airbag.

3. The middle side airbag of claim 1, wherein the plurality of vertically sewed lines includes three vertical sewed lines to restrict inflation of the middle side airbag in the lateral direction.

4. The middle side airbag of claim 1, wherein each vertically sewed line is inclined.

5. The middle side airbag of claim 3, wherein each vertically sewed line is inclined.

6. The middle side airbag of claim 3, wherein the vertical sewed lines are oriented parallel to one another.

7. The middle side airbag of claim 3, wherein the vertical sewed lines provide the middle side airbag with a deployed shape of a plate having a predetermined thickness.

8. The middle side airbag of claim 3, wherein inflation gases from the inflator enter the airbag in an first direction and the plurality of vertical sewed lines are spaced apart from one another in the lateral direction.

9. An airbag arrangement comprising:

an occupant seat;

an inflator carried by the occupant seat; and an airbag in communication from the inflator and deployable from a back part of the occupant seat in a lateral direction, the airbag including a plurality of spaced apart and parallel sewed lines for restricting inflation of the airbag in the lateral direction such that the airbag has a plate shape upon deployment with a predetermined thickness in the lateral direction, wherein the plurality of sewed lines are spaced apart from one another in the lateral direction.

10. The airbag arrangement of claim 9, wherein each sewed line extends vertically.

11. The airbag arrangement of claim 10, wherein each sewed line is inclined relative to the vertical.

\* \* \* \* \*